(12) United States Patent
Milinusic et al.

(10) Patent No.: US 6,609,798 B1
(45) Date of Patent: Aug. 26, 2003

(54) DIGITAL LIGHT PROJECTION SYSTEM

(76) Inventors: Tomislav F. Milinusic, 3289 Cardiff Way, Decatur, GA (US) 30033; Allan D. Beach, 786 South Titirangi Road, Auckland (NZ)

(\*) Notice: Subject to any disclaimer, the term of this patent is extended or adjusted under 35 U.S.C. 154(b) by 0 days.

(21) Appl. No.: 10/086,400

(22) Filed: Feb. 28, 2002

Related U.S. Application Data

(60) Provisional application No. 60/272,192, filed on Feb. 28, 2001.

(51) Int. Cl.[7] .......................... G03B 21/28; G03B 21/26
(52) U.S. Cl. ............................ 353/98; 353/37; 353/99
(58) Field of Search .............................. 353/37, 98, 99, 353/122, 7, 30, 34; 348/742, 743, 771, 782, 784

(56) References Cited

U.S. PATENT DOCUMENTS

| | | | | |
|---|---|---|---|---|
| 3,590,155 A | \* | 6/1971 | Ring | 348/783 |
| 5,245,369 A | \* | 9/1993 | Um et al. | 353/122 |
| 5,629,801 A | \* | 5/1997 | Staker et al. | 359/572 |
| 6,082,861 A | \* | 7/2000 | Dove et al. | 353/20 |
| 6,129,437 A | \* | 10/2000 | Koga et al. | 353/98 |

\* cited by examiner

*Primary Examiner*—Russell Adams
*Assistant Examiner*—Andrew Sever

(57) ABSTRACT

A digital light projection system is provided that includes a light pipe for generating and outputting a light beam. An input mirror is provided that is configured to receive a light beam from the light pipe and deflect it onto a digital mirror device (DMD). The DMD is configured to deflect the light beam onto an imaging mirror that is configured to image the light beam onto a flat mirror.

20 Claims, 7 Drawing Sheets

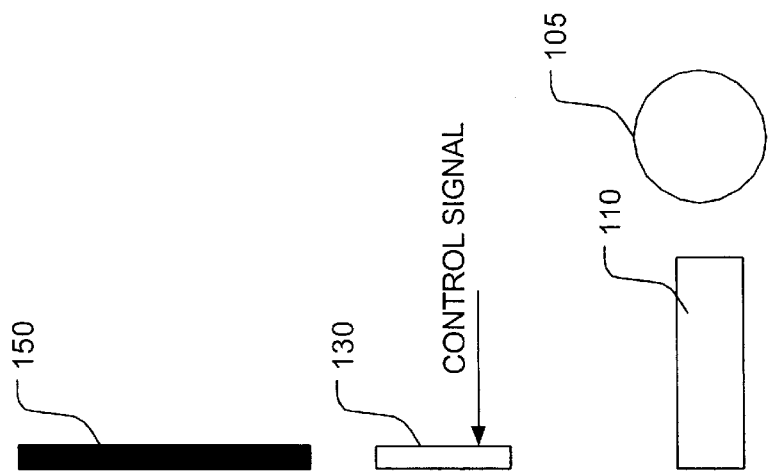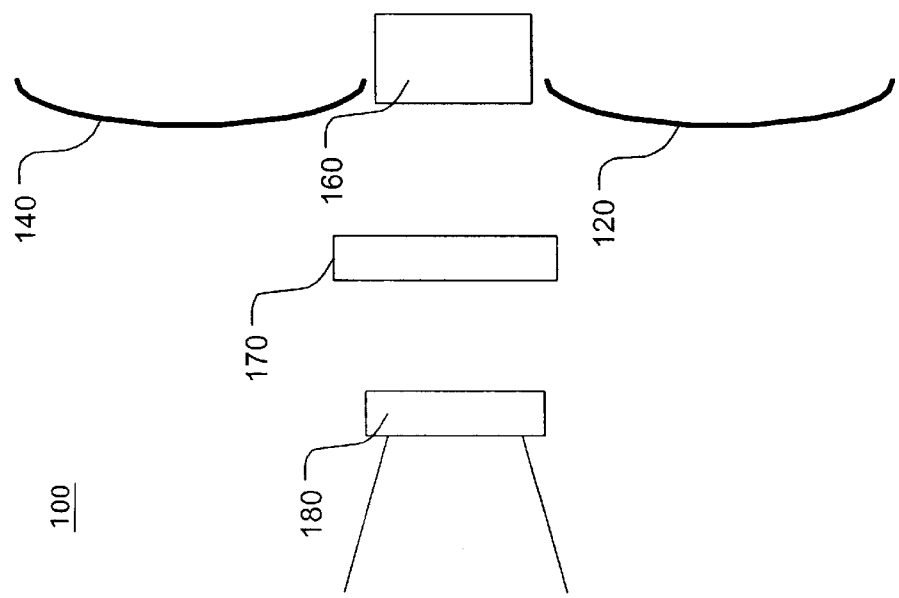
FIG. 1A

DIGITAL LIGHT PROJECTION SYSTEM

CLAIM OF PRIORITY

This application claims priority to copending U.S. provisional application entitled, "Digital Light Projection System," having Ser. No. 60/272,192 filed Feb. 28, 2001, the disclosure of which is entirely incorporated herein by reference.

TECHNICAL FIELD

The present invention is generally related to digital light projectors and, more particularly, to a digital light projector (DLP) that provides for increased light throughput or etendue.

BACKGROUND OF THE INVENTION

In known digital light projection (DLP) systems, the angle of acceptance of the projection system is limited and as a result only a small percentage of light available to the system is actually output. This requires higher powered light sources in order to ensure that a suitable level of light is actually output from the projection system.

Further, in DLP systems, it is common for the focus, brightness, color balance and/or color convergence to vary over the course of projecting imagery. This is due in part to the mechanical expansion and contractions of components within the DLP system due to changing temperatures within the DLP.

Thus, a heretofore unaddressed need exists in the industry to address the aforementioned deficiencies and inadequacies.

SUMMARY OF THE INVENTION

The present invention provides a A digital light projection system. Briefly described, in architecture, the system can be implemented as follows. There is provided a light pipe for generating and outputting a light beam. An input mirror is provided that is configured to receive a light beam from the light pipe and deflect it onto a digital mirror device (DMD). The DMD is configured to deflect the light beam onto an imaging mirror that is configured to image the light beam onto a flat mirror. The DMD is controllable via a control signal from a controller.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a block diagram of a representation of a side view of an embodiment of a digital light projector according to the present invention.

DETAILED DESCRIPTION OF THE PREFERRED EMBODIMENT

Figure 1B:
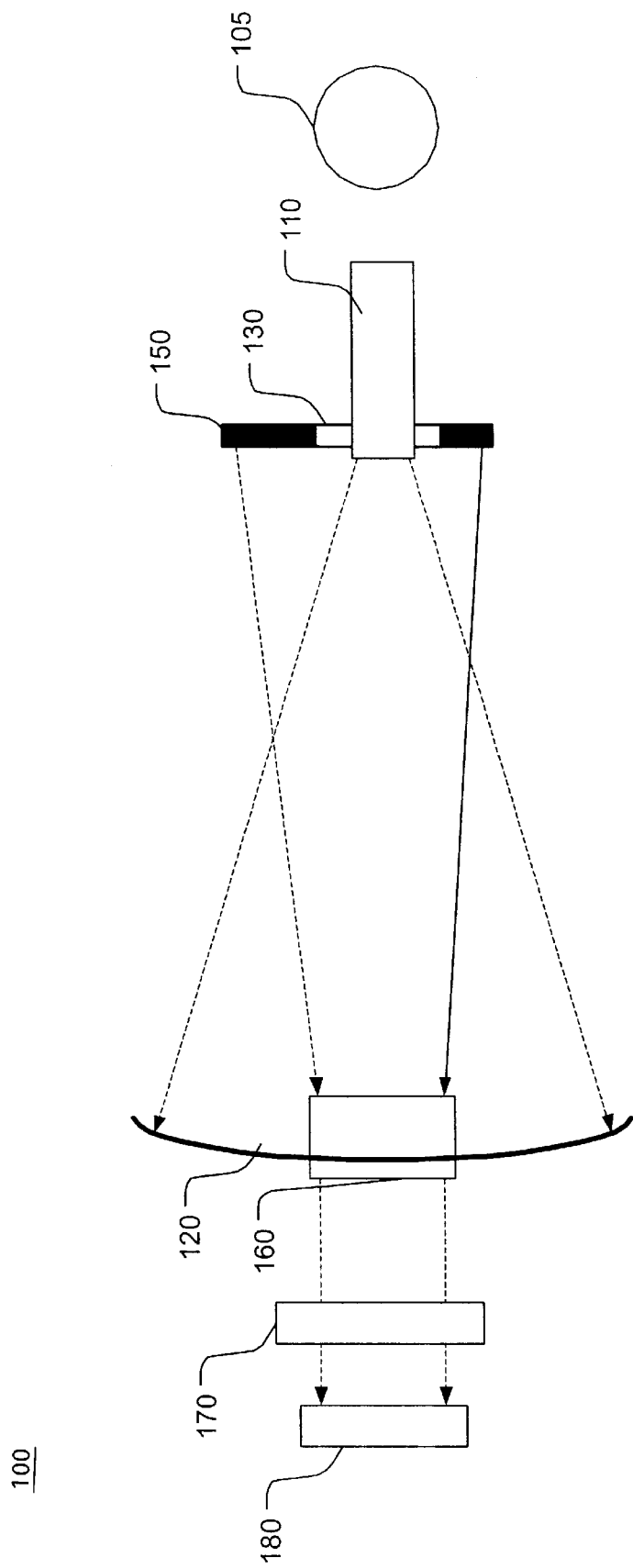
FIG. 1B is a block diagram of a representation of a top view of an embodiment of a digital light projector according to the present invention.

FIG. 1A shows a top view of an embodiment of a digital light projector 100 according to the present invention. FIG. 1B shows a side view of digital light projector 100. With reference to FIG. 1A and FIG. 1B, it can be seen that there is provided a light pipe 110, an input mirror 120; a digital mirror device (DMD) 130, a imaging mirror 140; a flat reflector mirror 150; a correction lens 160, a field lens 170 and a projection lens 180.

Light pipe 110 is preferably a non-coherent light pipe. Further light pipe 110 may be, for example, a light tube having a silver coated interior surface for reflecting light input to the light tube. Light tube 110 may be configured to include a light source 105. Light source 105 may be, for example, a xenon arc lamp or a metal halide arc lamp. Light pipe 110 may also be configured to include a multi spectral beam splitter that provides separate outputs of light for the red, green and blue spectral components.

Input mirror 120 is preferably a spherical mirror and, more particularly it may be, for example, a low tolerance replicating mirror. The input mirror 120 is preferably configured to receive a beam of light from the light pipe 110 and reflect a beam of light that occupies a solid angle onto the DMD 130 subtended at the DMD 130 at an angle of, for example, 40° normal to the axis of tilt of the DMD 130, by an angle of, for example, 60° in the plane parallel to the tilt axis of the DMD 130. The DMD is modulated by a control signal from a controller (not shown), which causes the xenon arch lamp light beam directed onto the DMDs to be reflected off at a particular angle to enable the projected image.

By directing light from input mirror 120 onto DMD 130 at an angle (oblique illumination), light loss into the 3D structure of the DMD 130 may be used to increase the contrast ratio of the light reflected from the DMD 130.

In one embodiment, separate DMDs 130 may be dedicated for each of the light color spectrums red, green and blue (RGB). In other words, for an RGB projection system, three separate DMDs may be provided along with separate associated light pipes 110, input mirrors 120, imaging mirrors 140, flat mirrors 150 and correction lens 160. Imaging mirror 140 is preferably a silver coated spherical mirror.

Figure 2A:
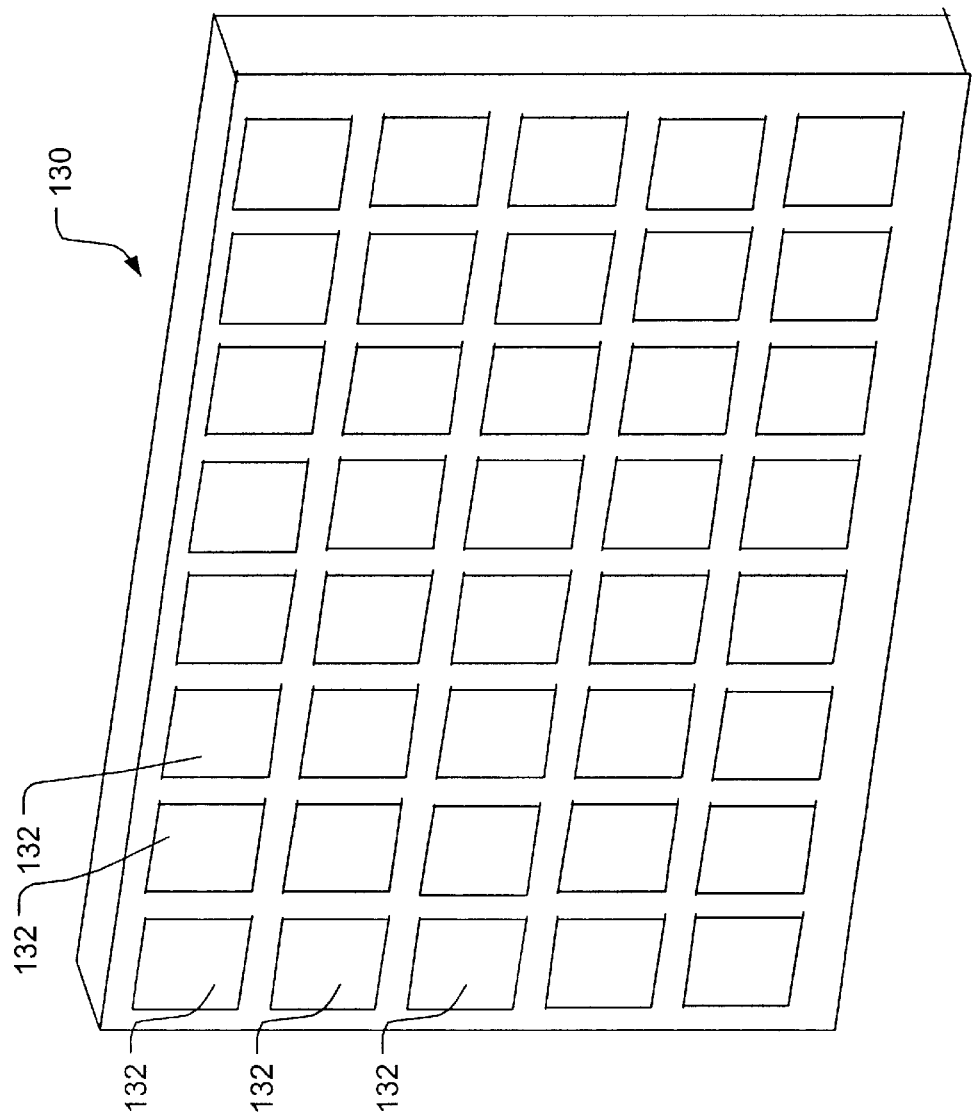
FIG. 2A a diagram illustrating a representation of a digital mirror device (DMD) 130.
Figure 2B:
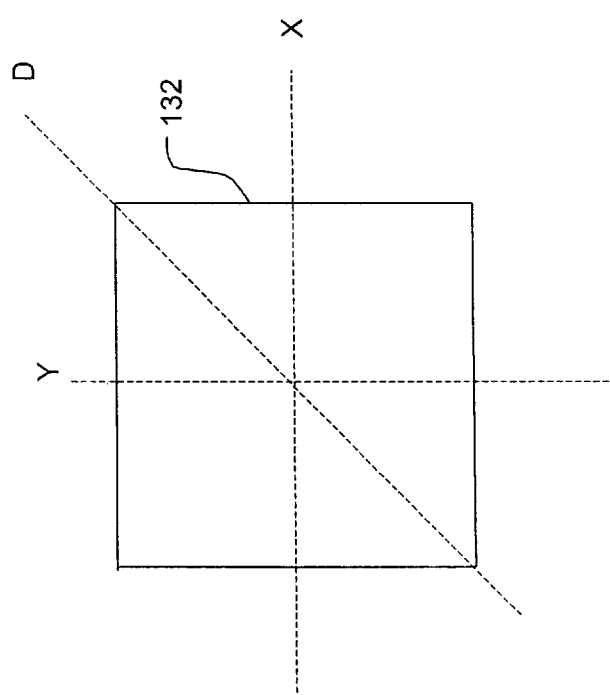
FIG. 2B a diagram further illustrating a representation of a digital mirror device (DMD) 130.

FIG. 2A shows that DMD 130 is an array of micro mirrors 132, each of which are rotatable about at least one axis (x, y or d), as shown in FIG. 2B. The rotation of each micro mirror is controlled via control signals from a controller (not shown).

Figure 3:
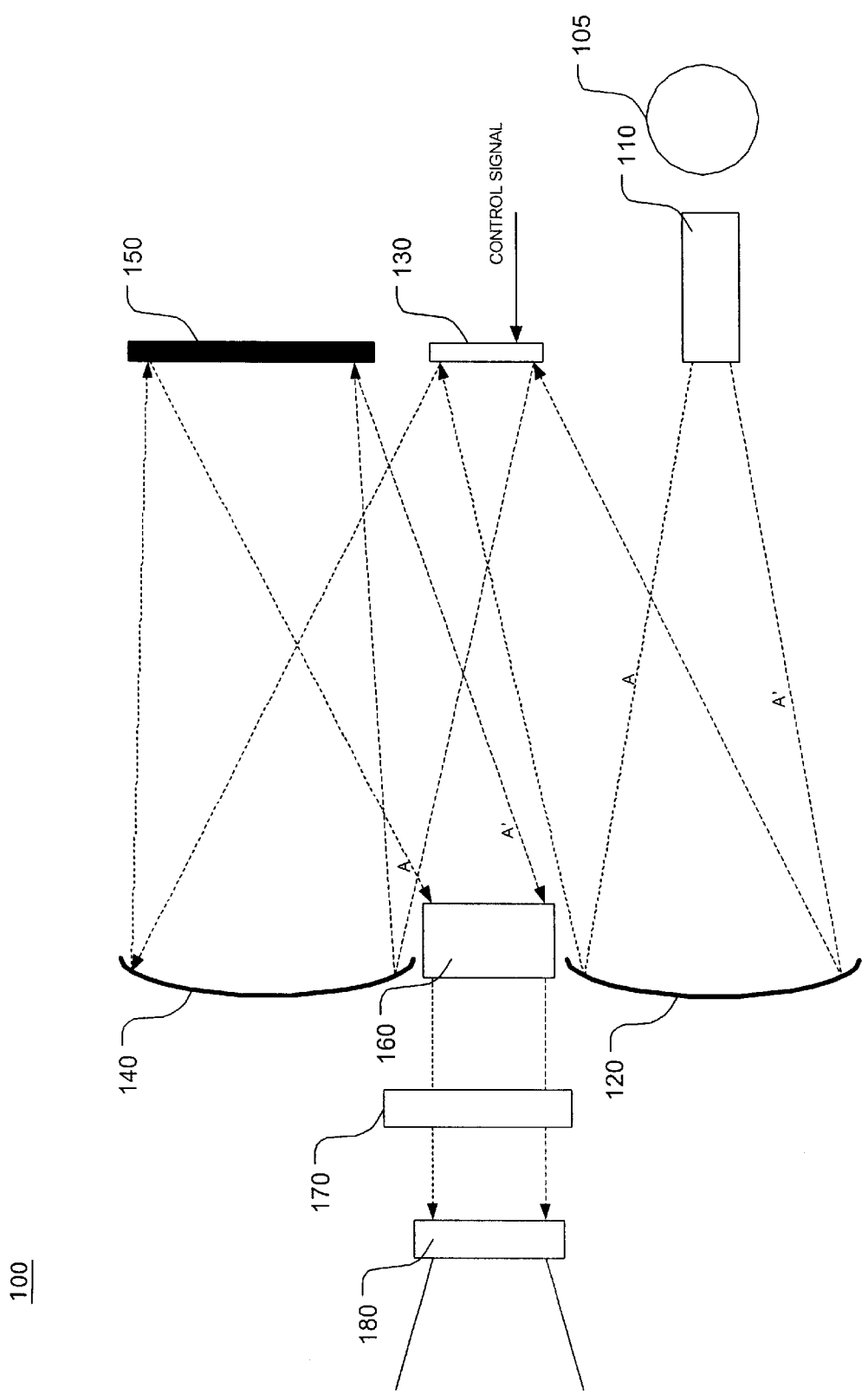
FIG. 3 is a diagram illustrating what the propagation of a light beam A and A' thru DLP 100.

With reference to FIG. 3 a light source 105, such as a xenon arc lamp generates a light beam A and A' that is directed onto input mirror 120 via light pipe 110. Input mirror 120 reflects the light beam A/A' onto the DMD 130. In turn DMD 130, under the control of a controller (not shown) adjusts/modulates the micro mirrors 132 (FIG. 2A) to redirect the light beam A/A' onto the imaging mirror 140.

In turn imaging mirror 140 images the light beam A/A' onto the flat mirror 150. Flat mirror 150 reflects the light beam A/A' onto the correction lens 160 from where it is then output to the field lens 170 and focusing lens 180.

Figure 4:
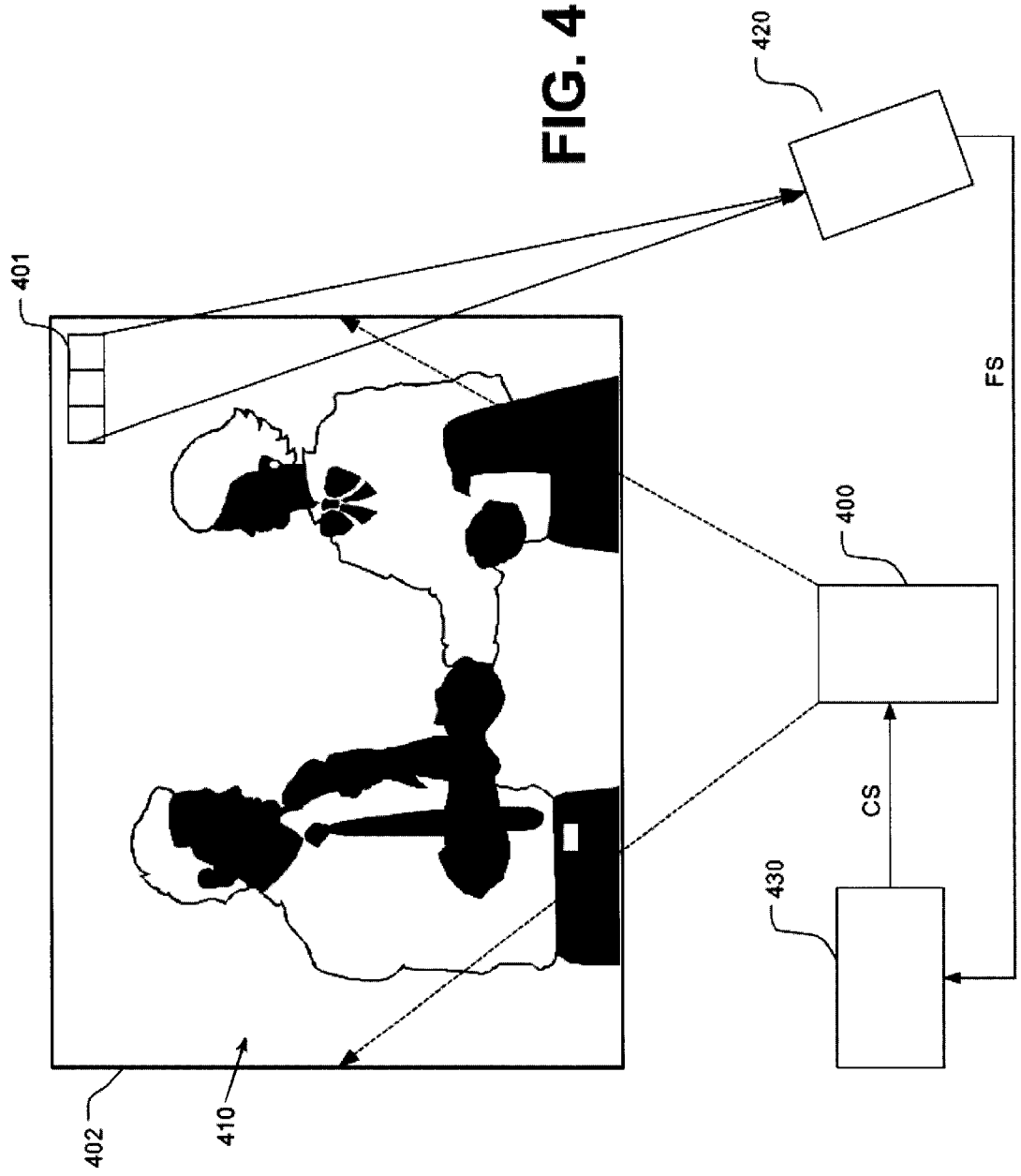
FIG. 4 is a diagram showing a DLP 400 that is projecting imagery onto a plane 402.

Another embodiment of the present invention is directed to providing a control feedback system for a DLP. FIG. 4 shows a DLP 400 that is projecting imagery 411 onto a plane 402. Reference images/points 401 are projected onto the plane 402 at which imagery is projected/displayed. These reference points 401 are detected, or imaged, by the feedback detector 420, which generates a feedback signal FS based upon the captured image of the reference point 401. This feedback signal FS is provided to a controller 430. Controller 430 then generates a control signal CS based upon the feedback signal FS. This control signal CS is provided to the DLP 400. In turn the DLP adjusts based upon the control signal CS from controller 430.

Feedback signal FS represents the reference point 401 as captured by the feedback detector 420. In one embodiment, feedback signal FS is compared with reference data to determine what parameters require adjustment. These parameters may include color balance, focus, brightness or convergence. Based upon the comparison, controller 430 outputs the control signal CS that causes the DLP 400 to be adjusted accordingly. More particularly, DLP 400 may adjust the focusing lens to bring the image into focus, adjust the DMD modulation so as to correct color imbalances or brightness within the projected image. Further, adjustments may be to correct color convergence.

Reference image 401 may be an RGB image projected via a laser at predetermined intermittent intervals. The frequency of the projection may be set to be fast enough that the human eye cannot detect it so that viewers of the projected imagery will not detect the presence of the projected reference image.

The feedback detector unit 420 may be incorporated as a part of the DLP 400 if desired. Alternatively, it may be configured as a separate stand-alone unit. Further, multiple reference images may be projected either simultaneously or separately at different time. The reference image may further be configured to test or provide feedback for only a specific parameter, if desired.

In another embodiment of the present invention, a system is provided in which an audio control signal is encoded and included as a part of the digital source material projected via DLP 100. These audio control signals can be used to make such things as ambient sound sensations fit the environment depicted in a projected scene.

This control signal provides an indication to audio reproduction system equipment of the nature of the environment in which the corresponding projected scene is carried out. Based on this control signal, the audio reproduction system will adjust ambient sound parameters, such as, for example, reverberation, attack and decay to provide a realistic sound environment for a corresponding projected scene.

Figure 5:
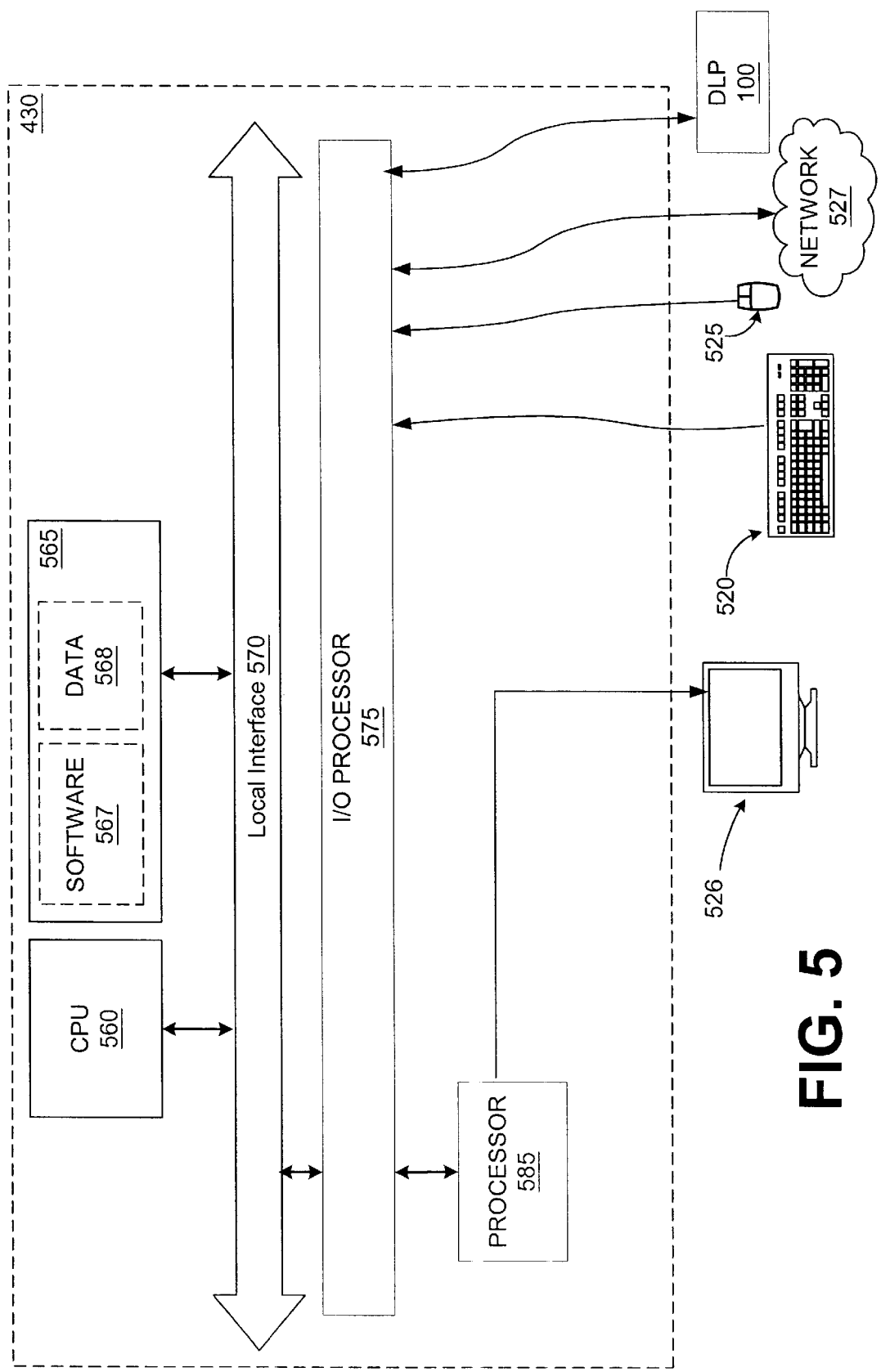
FIG. 5 is a block diagram further illustrating controller 430.

FIG. 5 is a block diagram of a further embodiment of DLP controller 430 according to the present invention. This embodiment includes a central processing unit 560, storage memory 565 for storing data 568 and/or software 567. An input/output (I/O) processor 575 is provided for interfacing with associated input and output devices. A local interface 570 is provided for transferring data between the CPU 560, memory 565 and/or I/O processor 575. A processor 585 is provided for processing graphics data and outputting to a display device 526. Associated input and output devices may include keyboard device 520, mouse/pointing device 525, DLP 100 and/or a network 527. Network 527 may be a local area network (LAN) or a wide area network (WAN) such as, for example, the Internet. Controller 430 may alternatively connect to and access/control the DLP 100 via network 527.

CPU 560 is preferably configured to operate in accordance with software 567 stored on memory 565. CPU 560 is preferably configured to evaluate the feedback signal FS and compare it with reference data to generate a control signal CS for controlling the operation of DLP 100. Software 567 may include software configured to cause CPU 560 to evaluate the feedback signal FS and compare it with reference data to generate a control signal CS.

The processor 585, and/or CPU 560 of the present invention can be implemented in hardware, software, firmware, or a combination thereof. In the preferred embodiment(s), the processor 585 is implemented in software or firmware that is stored in a memory and that is executed by a suitable instruction execution system. If implemented in hardware, as in an alternative embodiment, the processor 585 and/or CPU 560 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc. Processor 585 may be implemented as a general-purpose processor, such as, for example the Intel® Pentium IV central processing unit. Further, processor 585 may be implemented as a graphics processor or a digital signal processor (DSP). The processor 585 may be configured to incorporate or otherwise carry out the functions of CPU 560. CPU 560 may also be configured to incorporate or otherwise carry out the functions of processor 585.

The software 567 comprises a listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A light projection system comprising:
   a light pipe for generating and outputting a light beam;
   an input mirror
   digital mirror device (DMD)
   imaging mirror;
   flat reflector mirror;
   correction lens
   said input mirror is configured to receive a light beam from said light pipe and deflect it onto said DMD;
   said DMD is configured to deflect said light beam onto said imaging mirror;
   said imaging mirror is configured to image said light beam onto said flat mirror; and
   said flat mirror is configured so as to deflect said light beam onto said correction lens.

2. A light projection system according to claim 1 further comprising a field lens and a focusing lens for receiving said light beam from said correction lens.

3. A light projection system according to claim 1 wherein said light pipe comprises a non-coherent light pipe.

4. A light projection system according to claim 3 wherein said light pipe comprises a light tube, said light tube comprising a silver coated interior for reflecting said light beam into said light tube.

5. A light projection system according to claim 4 wherein said light pipe further comprises a light source.

6. A light projection system according to claim 5 wherein said light source comprises a xenon arc lamp.

7. A light projection system according to claim 4 wherein said light pipe further comprises a multi-spectral beam splitter.

8. A light projection system according to claim 3 wherein said input mirror comprises a spherical mirror.

9. A light projection system according to claim 8 wherein said spherical mirror comprises a replicated mirror.

10. A light projection system according to claim 8 wherein said replicating mirror comprises a low tolerance replicated mirror.

11. A light projection system according to claim 1 wherein said light beam is deflected from said input mirror onto said DMD at an angle so as to increase the contrast ratio of said light beam.

12. A light projection system according to claim 1 wherein said DMD is movable about a predetermined axis.

13. A light projection system according to claim 12 wherein said predetermined angle comprises an angle of 40° normal to said axis, by an angle of 60° in a plane parallel to said axis.

14. A light projection system according to claim 12 wherein said DMD comprises an array of micro mirrors, each of which are rotatable about a predetermined axis.

15. A light projection system according to claim 14 wherein said DMD is configured to be controlled by a control signal received from a controller.

16. A light projection system according to claim 15 further comprising said controller.

17. A light projection system according to claim 1 wherein said input mirror is configured to receive said light beam from said light pipe and reflect it onto said DMD as a light beam that occupies a solid angle and is subtended at the DMD at a predetermined angle.

18. A light projection system comprising:
    a non-coherent light pipe for generating and outputting a light beam;
    a low tolerance replicating mirror;
    digital mirror device (DMD) comprising a plurality of micro mirrors;
    imaging mirror;
    flat reflector mirror;
    correction lens;
    said low tolerance replicated mirror is configured to receive a light beam from said light pipe and deflect it onto said DMD at an angle so as to increase the contrast ratio of said light beam;
    said DMD is configured to deflect said light beam onto said imaging mirror;
    said imaging mirror is configured to image said light beam onto said flat mirror; and
    said flat mirror is configured so as to deflect said light beam onto said correction lens.

19. A light projection system according to claim 18 wherein said DMD is controlled in accordance e with a control signal from a controller.

20. A light projection system according to claim 19 further comprising said controller.

* * * * *